United States Patent
Miura et al.

(10) Patent No.: US 12,385,217 B2
(45) Date of Patent: Aug. 12, 2025

(54) WORKING MACHINE

(71) Applicant: KUBOTA CORPORATION, Osaka (JP)

(72) Inventors: Takashi Miura, Osaka (JP); Tokio Sakata, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/744,942

(22) Filed: Jun. 17, 2024

(65) Prior Publication Data

US 2025/0003185 A1    Jan. 2, 2025

(30) Foreign Application Priority Data

Jun. 30, 2023   (JP) ................................. 2023-107903

(51) Int. Cl.
    *E02F 9/08*    (2006.01)
(52) U.S. Cl.
    CPC ................... *E02F 9/0883* (2013.01)
(58) Field of Classification Search
    CPC ...... E02F 9/0883; E02F 9/0866; B60K 11/02; B60K 11/04
    See application file for complete search history.

(56) References Cited

U.S. PATENT DOCUMENTS

| | | | |
|---|---|---|---|
| 9,266,422 B2 * | 2/2016 | Narita | F02B 77/13 |
| 11,085,352 B2 * | 8/2021 | Fujii | E02F 9/0866 |
| 11,230,212 B2 * | 1/2022 | Ichihara | E02F 9/0883 |
| 11,866,101 B2 * | 1/2024 | Aihara | B60N 3/048 |
| 2013/0112842 A1 | 5/2013 | Narita | |
| 2018/0245310 A1 | 8/2018 | Kumagai et al. | |
| 2019/0119883 A1 | 4/2019 | Ichihara et al. | |
| 2023/0315140 A1 | 10/2023 | Yoshida et al. | |
| 2024/0229422 A1 * | 7/2024 | Wakata | E02F 9/16 |
| 2024/0328111 A1 * | 10/2024 | Wakata | B60K 26/00 |

FOREIGN PATENT DOCUMENTS

| | | |
|---|---|---|
| JP | 2022-085490 A | 6/2022 |
| WO | 2017/061207 A1 | 4/2017 |

OTHER PUBLICATIONS

European Search Report, dated Dec. 4, 2024, in European Patent Office (EPO) family member Application No. 24 18 2103.2.

* cited by examiner

*Primary Examiner* — Paul N Dickson
*Assistant Examiner* — Tiffany L Webb
(74) *Attorney, Agent, or Firm* — GREENBLUM & BERNSTEIN, P.L.C.

(57) ABSTRACT

A working machine includes a machine body; a prime mover mounted on the machine body; a peripheral device disposed in a periphery of the prime mover; and an attachment bracket to support the peripheral device. The attachment bracket includes a base member to support the peripheral device in a vicinity of a driven unit to be driven with power of the prime mover, and a pressing member coupled to the base member, to hold the peripheral device between the pressing member and the base member.

11 Claims, 12 Drawing Sheets

WORKING MACHINE

CROSS REFERENCE TO RELATED APPLICATIONS

This application claims the benefit of priority to Japanese Patent Application No. 2023-107903 filed on Jun. 30, 2023. The entire contents of this application are hereby incorporated herein by reference.

BACKGROUND OF THE INVENTION

1. Field of the Invention

The present invention relates to a working machine such as a backhoe.

2. Description of the Related Art

In a working machine disclosed in Japanese Unexamined Patent Application Publication No. 2022-85490, a peripheral device such as a reserve tank that stores a coolant for a prime mover is disposed in the periphery of a prime mover.

SUMMARY OF THE INVENTION

Meanwhile, in this type of working machine, a cover body defining an outer shell of a machine body is configured to be openable/closable, and it is possible to inspect a prime mover and the like by opening the cover body. However, if a worker leans against or strongly touches the peripheral device disposed in the periphery of the prime mover during inspection work, a bracket supporting the peripheral device may be deformed or the peripheral device may fall off from the bracket. Then, the worker may inadvertently touch a driven unit, such as a cooling fan, an alternator, or a power transmission belt, that is driven with power of the prime mover.

The present invention is made to solve such a problem, and an object of the present invention is to improve support strength for a peripheral device.

The following is a technical solution employed by present invention to attain the object.

A working machine according to an aspect of the present invention includes a machine body; a prime mover mounted on the machine body; a peripheral device disposed in a periphery of the prime mover; and an attachment bracket to support the peripheral device. The attachment bracket includes a base member to support the peripheral device in a vicinity of a driven unit to be driven with power of the prime mover, and a pressing member coupled to the base member, to hold the peripheral device between the pressing member and the base member.

The base member may include a first coupling frame portion defining a coupling portion to the pressing member. The first coupling frame portion may be formed in a columnar shape extending in an up-down direction of the machine body.

The working machine may include a cover body defining an outer shell of the machine body, and a support frame vertically provided inside the machine body, to support the cover body. The first coupling frame portion may extend along a gap between the support frame and the peripheral device.

The pressing member may include a second coupling frame portion coupled to the first coupling frame portion. The second coupling frame portion may be formed in a columnar shape extending along the first coupling frame portion.

The pressing member may include a second coupling frame portion defining a coupling portion to the base member. The second coupling frame portion may be formed in a columnar shape extending in an up-down direction of the machine body.

The base member may include a lower frame portion to support the peripheral device from below. The pressing member may have an upper frame portion to hold the peripheral device from above.

The base member may include a first coupling frame portion defined by a plate-shaped member that is formed in an L shape when viewed from above and that has a first side surface portion and a second side surface portion, and having a columnar shape long in an up-down direction, and a lower frame portion laterally extending from a lower portion of the first coupling frame portion such that plate surfaces of the lower frame portion face in the up-down direction. The pressing member may include a second coupling frame portion defined by a plate-shaped member that is formed in an L shape when viewed from above and that has a third side surface portion and a fourth side surface portion, and having a columnar shape long in the up-down direction, and an upper frame portion laterally extending from an upper portion of the second coupling frame portion such that plate surfaces of the upper frame portion face in the up-down direction. The peripheral device may be held in a state of being sandwiched between the lower frame portion and the upper frame portion from above and below.

The base member may further include a holder portion extending upward from the lower frame portion. The peripheral device may be held in a state in which the peripheral device is sandwiched between the lower frame portion and the upper frame portion from above and below and a surface of the peripheral device near the driven unit is supported by the holder portion.

The holder portion may include a holder pillar extending upward from the lower frame portion and an insertion piece coupled to the holder pillar. The peripheral device may include an insertion groove in the surface near the driven unit. The surface of the peripheral device near the driven unit may be supported by the holder portion by the insertion piece being fitted into the insertion groove.

The upper frame portion may have a notch portion formed in a substantially arc shape. The peripheral device may have a neck portion protruding upward. The neck portion may be fitted into the notch portion.

The base member and the pressing member may be disposed at positions partially or entirely overlapping the driven unit as viewed from rear of the machine body.

The base member may have a window hole through which the driven unit is visually recognizable from the rear of the machine body.

The attachment bracket may include a coupling member to detachably couple the pressing member to the base member.

The attachment bracket may have an engagement portion to detachably engage the pressing member with the base member.

The peripheral device may be a reserve tank formed in a bottomed cylindrical shape having a fluid supply port portion in an upper surface portion, to store a coolant for the prime mover. The lower frame portion may extend along a bottom surface portion of the reserve tank. The upper frame portion may extend along the upper surface portion of the reserve tank.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
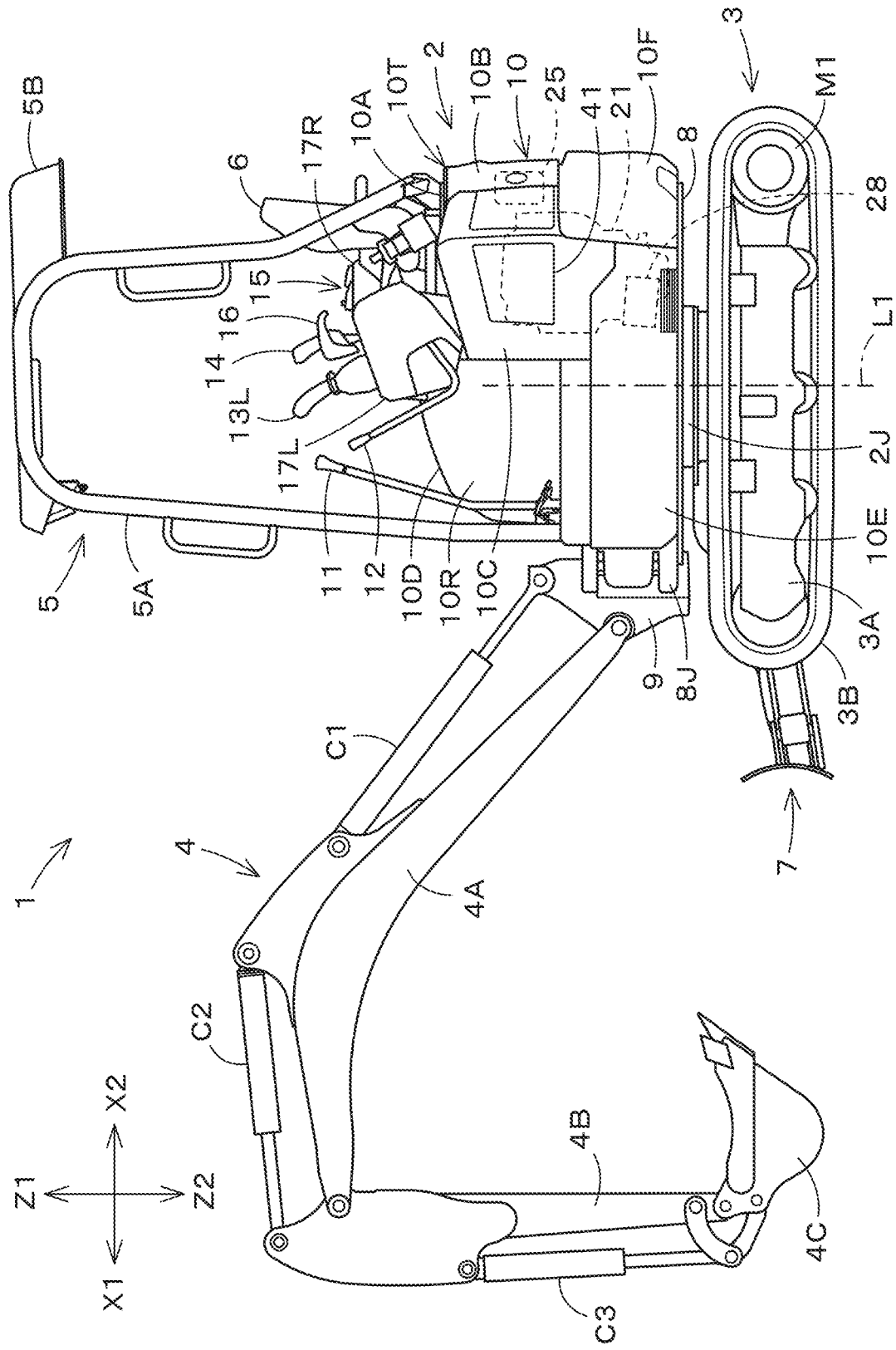
FIG. 1 is a left side view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

Figure 2:
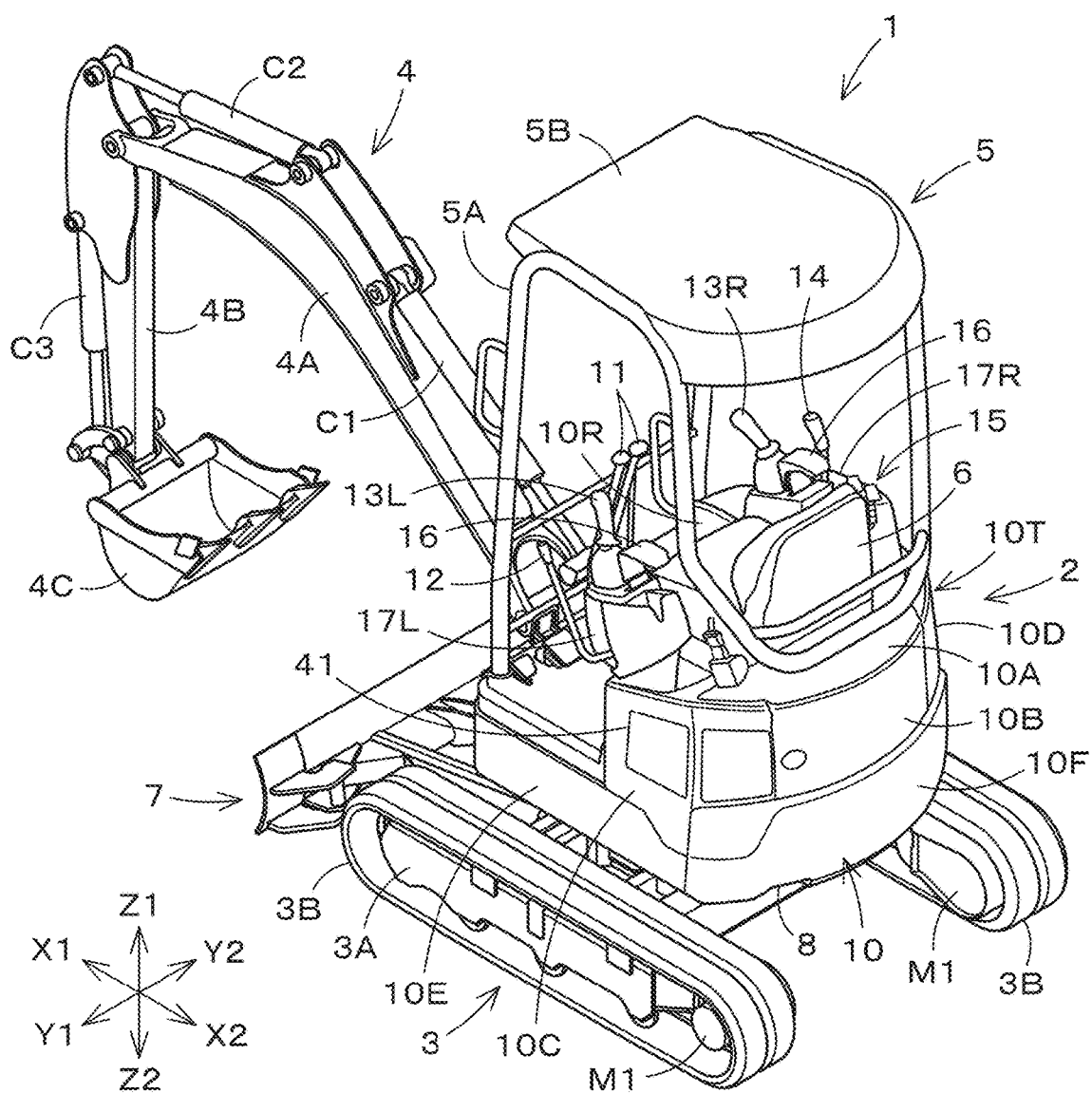
FIG. 2 is a left rear perspective view of the working machine.

As illustrated in FIGS. 1 and 2, a working machine 1 of the present embodiment is a backhoe including a machine body (turning base) 2, a traveling device 3, and a working device 4. A canopy 5 is mounted on the machine body 2. An operator's seat 6 on which an operator is seated is provided inside the canopy 5. The canopy 5 is a protection mechanism that protects the operator's seat 6, and includes a ROPS 5A and a roof 5B. Note that the working machine 1 is not limited to the backhoe, and may be another type of working machine. Also, instead of the canopy 5, a cabin surrounding the operator's seat 6 may be mounted on the machine body 2, as a protection mechanism that protects the operator's seat 6.

In the present embodiment, a direction in which the operator seated on the operator's seat 6 faces (a direction of arrow X1 in FIGS. 1 and 2) is referred to as a forward side of the machine body 2, and a direction opposite thereto (a direction of arrow X2 in FIGS. 1 and 2) is referred to as a rearward side of the machine body 2. Also, the left of the operator (a direction of arrow Y1 in FIG. 2) is referred to as a leftward side of the machine body 2, and a direction opposite thereto (a direction of arrow Y2 in FIG. 2) is referred to as a rightward side of the machine body 2. Further, the upper side of the operator (a direction of arrow Z1 in FIGS. 1 and 2) is referred to as an upward side of the machine body 2, and a direction opposite thereto (a direction of arrow Z2 in FIGS. 1 and 2) is referred to as a downward side of the machine body 2.

The traveling device 3 is a crawler type traveling device that supports the machine body 2 so as to be capable of traveling, and includes a traveling frame 3A and at least one traveling mechanism 3B. The traveling frame (track frame) 3A is a structure body to which the traveling mechanism 3B is attached on each of the left and right and that supports the machine body 2 from below. The traveling mechanism 3B is, for example, a crawler. The traveling mechanism 3B is driven by a traveling motor M1 provided in the traveling frame 3A. Note that the traveling device 3 is not limited to of the crawler type, and may be of a wheel type.

The traveling device 3 includes a dozer device 7. The dozer device 7 is provided at a front portion of the traveling frame 3A. The dozer device 7 is coupled to a dozer cylinder (hydraulic cylinder) provided in the traveling frame 3A, and is raised/lowered by the dozer cylinder being extended/contracted.

The working device 4 includes a boom 4A, an arm 4B, and a bucket 4C. Note that, instead of or in addition to the bucket 4C, another working tool (hydraulic attachment) that can be driven with a hydraulic fluid can be attached to the working machine 1. Examples of the other working tool include a hydraulic breaker, a hydraulic crusher, an angle broom, an earth auger, a pallet fork, a sweeper, a mower, and a snow blower.

The boom 4A is pivotally attached to a swing bracket 9 provided at a front portion of the machine body 2 so as to be swingable about a horizontal axis (an axis extending in the left-right direction). The boom 4A is coupled to the swing bracket 9 via a boom cylinder (hydraulic cylinder) C1, and is swung about the horizontal axis by the boom cylinder C1 being extended/contracted. Note that the swinging of the boom 4A is an action of raising the boom 4A upward in front of the machine body 2 or tilting the boom 4A forward of the machine body 2.

The arm 4B is pivotally attached to a distal end portion of the boom 4A so as to be swingable about a horizontal axis (an axis extending in the left-right direction). The arm 4B is coupled to the boom 4A via an arm cylinder (hydraulic cylinder) C2, and is swung about the horizontal axis by the arm cylinder C2 being extended/contracted. Note that the swinging of the arm 4B is an action of moving a distal end of the arm 4B toward the machine body 2 (crowding) or away from the machine body 2 (dumping).

The bucket 4C is pivotally attached to a distal end portion of the arm 4B so as to be swingable about a horizontal axis (an axis extending in the left-right direction). The bucket 4C is coupled to the arm 4B via a bucket cylinder (hydraulic cylinder) C3, and is swung about the horizontal axis by the bucket cylinder C3 being extended/contracted. Note that the swinging of the bucket 4C is an action of moving a distal end of the bucket 4C toward the machine body 2 (crowding) or away from the machine body 2 (dumping), and is, for example, an action of shoveling earth and sand or the like with the bucket 4C or dropping (discharging) the shoveled earth and sand or the like from the bucket 4C.

As illustrated in FIG. 1, the machine body 2 includes a turning base plate 8 defining a bottom portion of the machine body 2. The turning base plate 8 is formed of a thick plate material, and is supported on an upper portion of the traveling device 3 via a turning bearing 2J. That is, the machine body 2 is supported so as to be rotatable about a turning axis L1 of the turning bearing 2J relative to the traveling device 3. The turning axis L1 is the center of rotation of the turning bearing 2J. The turning base plate 8 is driven to turn about the turning axis L1 by a turning motor provided in the traveling device 3.

A support bracket 8J that supports the working device 4 is provided at a front portion of the turning base plate 8. The support bracket 8J is provided to protrude forward from the front portion of the machine body 2, and the swing bracket 9 is connected to a distal end portion of the support bracket 8J. The swing bracket 9 is pivotally attached to the distal end portion of the support bracket 8J so as to be swingable about a vertical axis (an axis extending in the up-down direction). The swing bracket 9 is coupled to a swing cylinder (hydraulic cylinder) provided in the machine body 2, and is swung about the vertical axis by the swing cylinder being extended/contracted.

Figure 3:
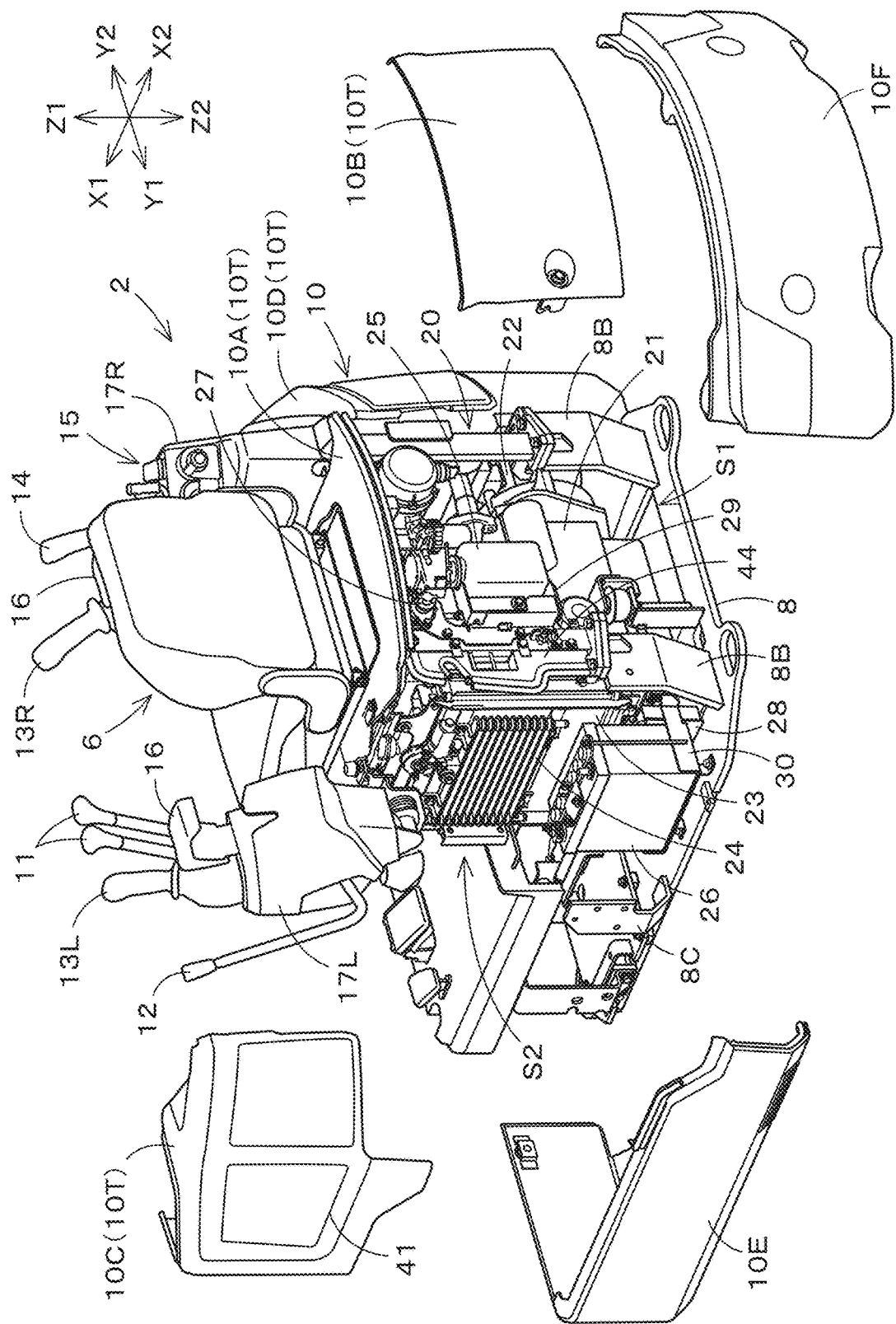
FIG. 3 is a left rear perspective view of a machine body in a state in which some cover bodies are separated.

As illustrated in FIGS. 1 to 3, a weight 10F is provided on a rear portion of the turning base plate 8. The weight 10F is a member for balancing the weight with the working device 4, and is disposed in a rear portion of the machine body 2. The weight 10F is formed in a substantially arc shape and is provided so as to cover the inside of the machine body 2 from the rear. That is, the weight 10F defines a portion of an outer cover (cover body) 10 defining an outer shell of the machine body 2.

In addition to the operator's seat 6, a traveling lever 11, an operation lock lever (unload lever) 12, manipulating levers 13L and 13R, a dozer lever 14, at least one operation switch 15, and at least one armrest 16 are provided in an upper portion of the machine body 2. The traveling lever 11 is an operation member for operating the traveling device 3, and is provided forward of the operator's seat 6. The operation lock lever 12 is an operation member for switching a hydraulic actuator mounted on the working machine 1 between an operable state and an inoperable state, and is provided at a left side portion of a left console portion 17L provided leftward of the operator's seat 6.

The manipulating levers 13L and 13R are operation members for operating the machine body 2 and the working device 4, and are provided at the left console portion 17L provided leftward of the operator's seat 6 and a right console portion 17R provided rightward of the operator's seat 6, respectively. The dozer lever 14 is an operation member for operating the dozer device 7, and is provided rightward and rearward of the manipulating lever (right manipulating lever) 13R at the right console portion 17R.

The operation switch 15 includes a plurality of operation switches 15 that are operation members for operating various devices provided in the working machine 1 and are provided rearward of the dozer lever 14 at the right console portion 17R. The armrest 16 is a member on which an elbow and the like of the operator seated on the operator's seat 6 is placed, and is provided rearward of each of the manipulating levers 13L and 13R at the left and right console portions 17L and 17R.

Figure 4:
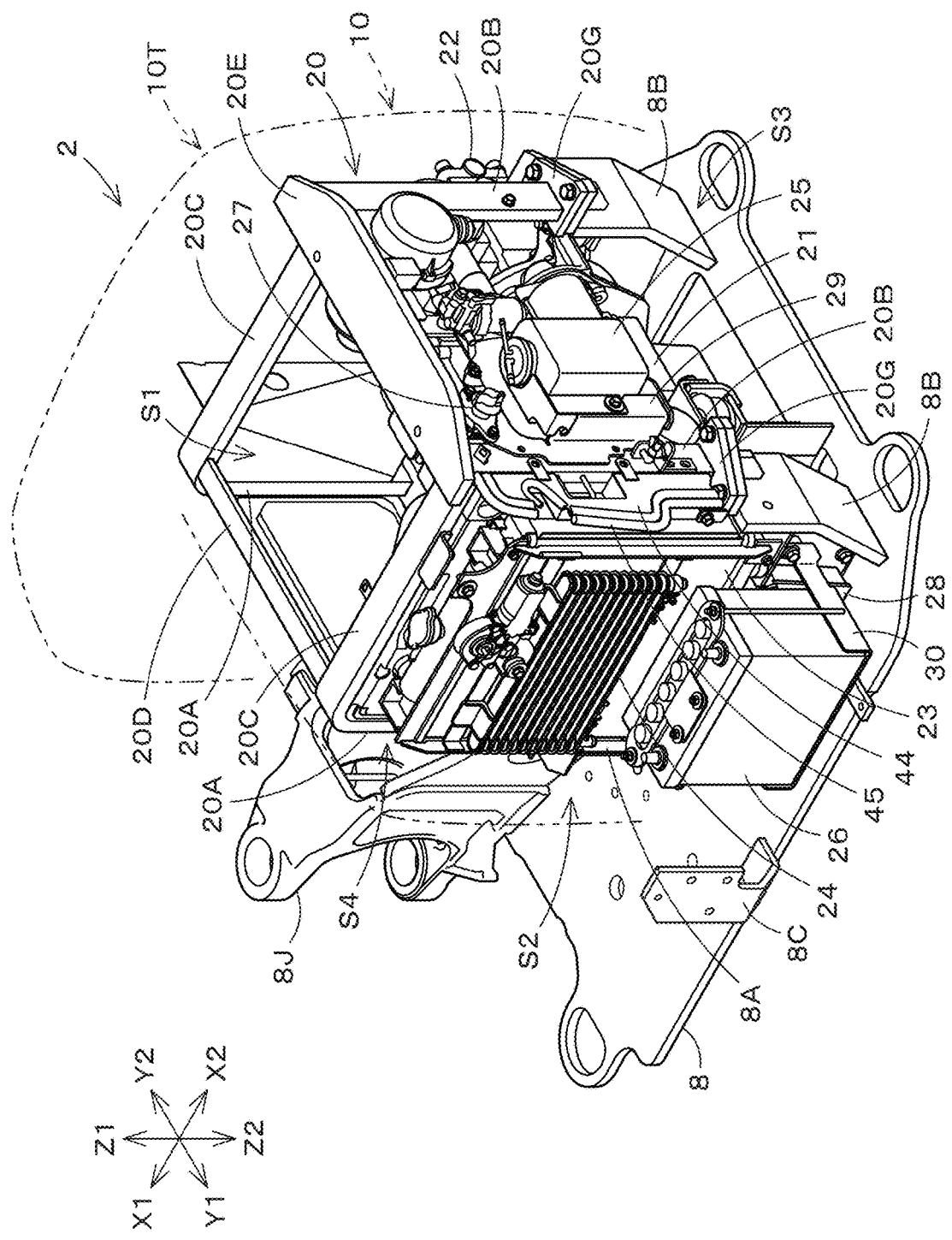
FIG. 4 is a left rear perspective view illustrating an internal structure of the machine body.

As illustrated in FIGS. 3 and 4, a support frame 20 is provided inside the machine body 2. Additionally, devices such as a prime mover 21, a hydraulic pump 22, a radiator 23, an oil cooler 24, a reserve tank 25, a battery 26, an isolator 27, and a controller 28 are mounted on the machine body 2. Note that the outer cover (cover body) 10 defining the outer shell of the machine body 2 includes a hood 10T that covers the prime mover 21. The support frame 20 supports the hood 10T.

The prime mover 21 of the present embodiment is a diesel engine. As illustrated in FIGS. 1 and 3, the prime mover 21 is disposed in a space (an inner space of the support frame 20) S1 located below the operator's seat 6 and inside the support frame 20. Note that the prime mover 21 is not limited to the diesel engine, and may be a gasoline engine, an electric motor, or a hybrid type prime mover including an engine and an electric motor.

Figure 5:
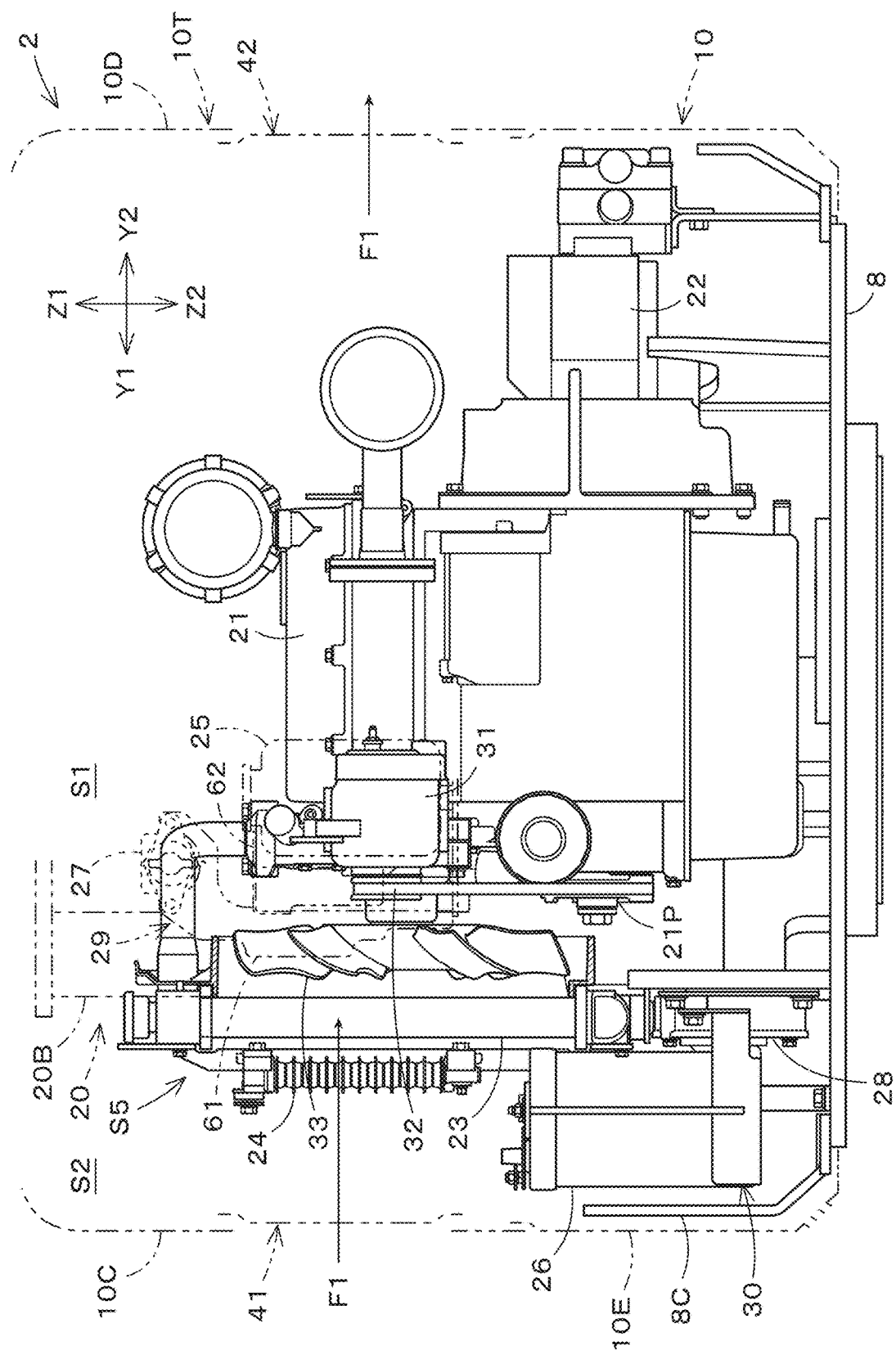
FIG. 5 is a rear view illustrating the internal structure of the machine body.

The hydraulic pump 22 is a device that is driven with power of the prime mover 21 and supplies a hydraulic fluid (pressure fluid) to hydraulic actuators such as hydraulic motors or hydraulic cylinders (swing cylinder, dozer cylinder, boom cylinder C1, arm cylinder C2, bucket cylinder C3) provided in the working machine 1. As illustrated in FIGS. 4 and 5, the hydraulic pump 22 is connected to a right side portion of the prime mover 21.

The radiator 23 is a cooler that cools a coolant that is circulated and supplied to the prime mover 21. The oil cooler 24 is a cooler that cools a hydraulic fluid that is supplied to the hydraulic actuators. The radiator 23 and the oil cooler 24 are both disposed in a space S2 located leftward of the support frame 20 in the outer cover 10.

The reserve tank 25 is a device that stores the coolant for the prime mover 21. As illustrated in FIGS. 3 and 4, the reserve tank 25 is disposed in a space S3 located rearward of the support frame 20 in the outer cover 10. The reserve tank 25 is attached to a rear portion of the support frame 20 via an attachment bracket 29. An attachment structure of the reserve tank 25 will be described later.

The battery 26 is a storage battery that supplies electric power to electrical components including a work lamp, a display, and meters (not illustrated), and the controller 28 mounted on the working machine 1. The battery 26 is disposed in the left space S2 of the support frame 20. The battery 26 is attached to an upper portion of the turning base plate 8 via a battery bracket 30.

The isolator 27 is a device that supplies electricity generated by an alternator 31 to the battery 26. The isolator 27 is attached to the rear portion of the support frame 20 via the attachment bracket 29. An attachment structure of the isolator 27 will be described later.

The controller 28 is a device (electronic control unit, ECU) that controls actions of the prime mover 21, the hydraulic pump 22, and the like mounted on the working machine 1. The controller 28 is disposed in the left space S2 of the support frame 20.

As illustrated in FIG. 5, the alternator 31 is provided at a rear portion of the prime mover 21. The alternator 31 is coupled to a drive shaft 21P of the prime mover 21 via a power transmission belt 32, and is rotationally driven with rotational power of the prime mover 21 to generate electricity to be stored in the battery 26.

A cooling fan 33 is provided at a left side portion of the prime mover 21. The cooling fan 33 is coupled to the drive shaft 21P of the prime mover 21 via the power transmission belt 32, and is rotationally driven with the rotational power of the prime mover 21 to generate cooling air F1 for cooling the prime mover 21 inside the machine body 2.

Thus, driven units that are driven with the power of the prime mover 21, such as the cooling fan 33, the alternator 31, and the power transmission belt 32, are provided inside the machine body 2 in addition to the prime mover 21. Also, as illustrated in FIGS. 3 and 4, peripheral devices, such as the reserve tank 25 and the isolator 27, are disposed in the space S3 located rearward of the support frame 20 inside the machine body 2, that is, in the periphery of the prime mover 21.

As illustrated in FIGS. 2 and 3, the outer cover 10 includes a first cover body 10A disposed in the upper portion of the machine body 2 and lower than the operator's seat 6, a second cover body 10B disposed in an upper rear portion of the machine body 2, a third cover body 10C disposed in an upper left side portion of the machine body 2, a fourth cover body 10D disposed in an upper right side portion of the machine body 2, a fifth cover body 10E disposed in a lower left side portion of the machine body 2, and the weight 10F disposed in a lower rear portion of the machine body 2. Further, although not illustrated, the outer cover 10 includes a sixth cover body disposed in a lower right side portion of the machine body 2 and a seventh cover body disposed in the front portion of the machine body 2.

The hood 10T that covers the prime mover 21 includes the first cover body 10A, the second cover body 10B, the third cover body 10C, and the fourth cover body 10D. The first cover body 10A, the second cover body 10B, the third cover body 10C, and the fourth cover body 10D are supported by the support frame 20 (see FIG. 4).

As illustrated in FIGS. 1 and 3, the first cover body 10A is a cover member that covers the front and upper side of the prime mover 21, and is fixed to left and right front pillar portions 20A and a rear upper frame portion 20E (see FIG. 4) of the support frame 20 by bolts or the like.

The second cover body 10B is a cover member that covers the rear of the prime mover 21 (an upper region of the rear space S3 of the support frame 20), and a right side edge portion of the second cover body 10B is coupled to and supported by a right rear pillar portion 20B (see FIG. 4) of the support frame 20 by a hinge mechanism. That is, the second cover body 10B is pivotally coupled to the right rear pillar portion 20B of the support frame 20 so as to be swingable about a vertical axis (an axis extending in the up-down direction). The isolator 27 and the reserve tank 25 are disposed inward (forward) of the second cover body 10B. Thus, a worker can access the reserve tank 25 and the isolator 27 disposed in the rear space S3 of the support frame 20, the prime mover 21, the alternator 31, and the power transmission belt 32 disposed in the inner space S1 of the support frame 20, and the like from the rear of the machine body 2 by swinging the second cover body 10B outward (rearward) of the machine body 2 to open the second cover body 10B.

The third cover body 10C is a cover member that covers the left of the prime mover 21 (an upper region of the left space S2 of the support frame 20), and a front edge portion of the third cover body 10C is coupled to and supported by the left front pillar portion 20A (see FIG. 4) of the support frame 20 by a hinge mechanism. That is, the third cover body 10C is pivotally coupled to the left front pillar portion 20A of the support frame 20 so as to be swingable about a vertical axis (an axis extending in the up-down direction). The radiator 23 and the oil cooler 24 are disposed inward (rightward) of the third cover body 10C. The battery 26 is disposed inward and downward (rightward and downward) of the third cover body 10C. Thus, the worker can access the radiator 23, the oil cooler 24, the battery 26, and the like disposed in the left space S2 of the support frame 20 from the left of the machine body 2 by swinging the third cover body 10C outward (leftward) of the machine body 2 to open the third cover body 10C.

The third cover body 10C has a first outside air inlet 41. The first outside air inlet 41 is an air intake for taking outside air into the machine body 2. The first outside air inlet 41 is covered with a member having air permeability, such as a perforated metal, an expanded metal, or a welded wire mesh.

The fourth cover body 10D is a cover member that covers the right of the prime mover 21, and is fixed to a side surface cover 10R (see FIG. 1) that is vertically provided forward and rightward of the operator's seat 6 (rightward of the feet of the worker seated on the operator's seat 6) in the upper portion of the machine body 2 by a bolt or the like.

As illustrated in FIG. 5, the fourth cover body 10D has an air outlet 42. The air outlet 42 discharges the outside air (cooling air F1) taken into the machine body 2 to the outside. The air outlet 42 is covered with a member having air permeability, such as a perforated metal, an expanded metal, or a welded wire mesh, similarly to the first outside air inlet 41 of the third cover body 10C.

As illustrated in FIGS. 1 and 3, the fifth cover body 10E is a cover member that covers the left of the prime mover 21 (a lower region of the left space S2 of the support frame 20), and is fixed to a bracket member 8C (see FIG. 5) vertically provided on a left side portion of the turning base plate 8 and a lower portion of the turning base plate 8 by bolts or the like. The battery 26 and the controller 28 are disposed inward (rightward) of the fifth cover body 10E.

Figure 6:
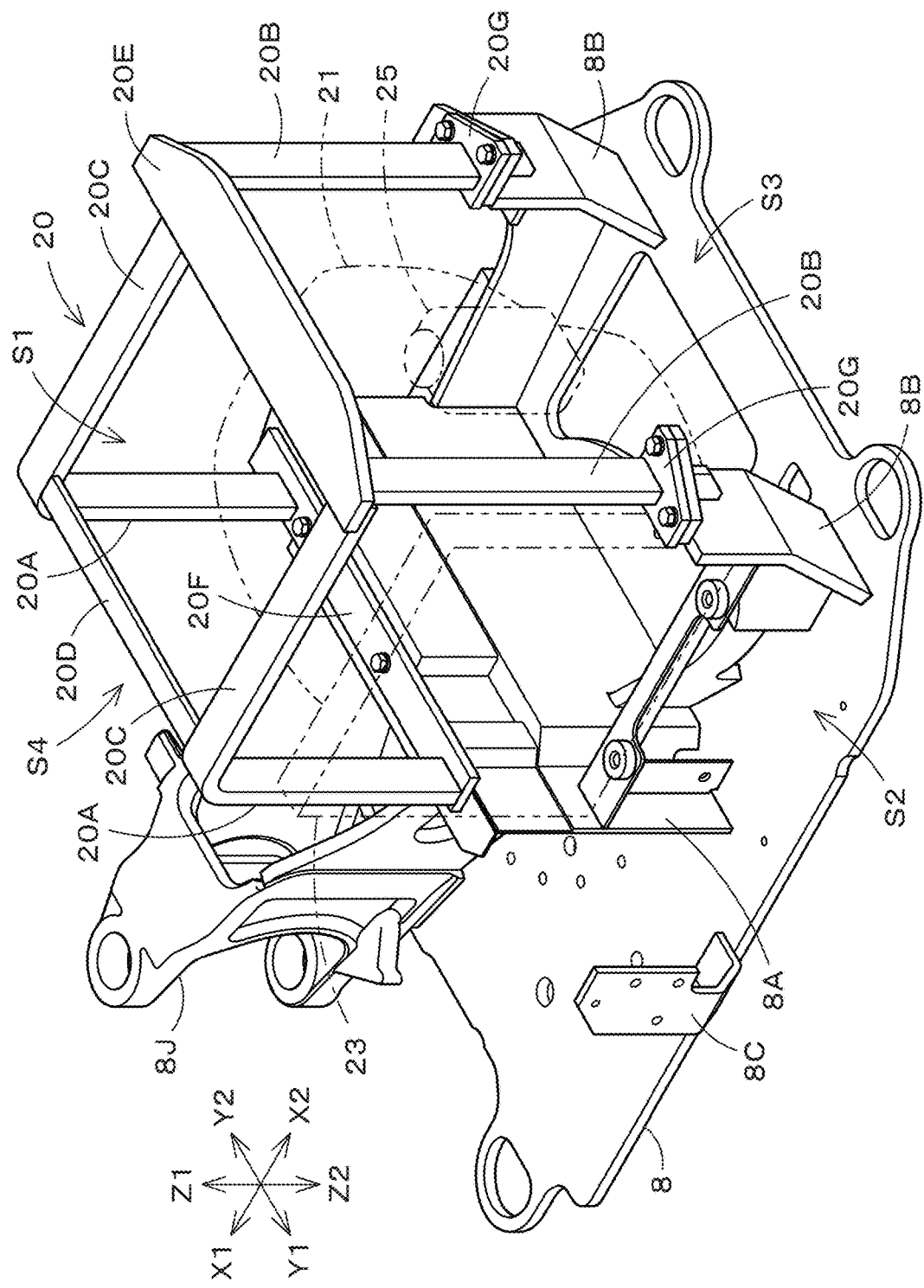
FIG. 6 is a left rear perspective view of a support frame.

As illustrated in FIG. 6, the support frame 20 is vertically provided on the turning base plate 8. The support frame 20 includes at least one front pillar portion 20A, at least one rear pillar portion 20B, at least one upper side frame portion 20C, a front upper frame portion 20D, a rear upper frame portion 20E, a front attachment plate 20F, and at least one rear attachment plate 20G.

The front pillar portion 20A includes a pair of front pillar portions 20A disposed forward of the prime mover 21 so as to extend in the up-down direction and to be spaced apart from each other in the left-right direction. The rear pillar portion 20B includes a pair of rear pillar portions 20B disposed rearward of the prime mover 21 so as to extend in the up-down direction and to be spaced apart from each other in the left-right direction.

The upper side frame portion 20C is formed to extend rearward from each of upper portions of the left and right front pillar portions 20A. The upper side frame portions 20C are formed integrally with the front pillar portions 20A. Rear portions of the left and right upper side frame portions 20C are coupled and fixed to upper portions of the rear pillar portions 20B disposed rearward of the rear portions of the upper side frame portions 20C.

The front upper frame portion 20D is provided across the upper portions of the left and right front pillar portions 20A, and couples the upper portions to each other and couples front portions of the left and right upper side frame portions 20C to each other. The rear upper frame portion 20E is provided across the upper portions of the left and right rear pillar portions 20B, and couples the upper portions to each other and couples the rear portions of the left and right upper side frame portions 20C to each other.

The front attachment plate 20F is provided across lower portions of the left and right front pillar portions 20A and couples the lower portions to each other. The front attachment plate 20F is fixed to an upper portion of a partition wall 8A vertically provided on the turning base plate 8, by a bolt or the like. That is, the front pillar portions 20A are vertically provided on the upper portion of the partition wall 8A. The partition wall 8A is vertically provided forward of the prime mover 21 on the turning base plate 8, and provides partition between the inner space S1 of the support frame 20 and a space S4 located forward of the support frame 20.

The rear attachment plate 20G is fixed to each of upper portions of a pair of left and right bracket members 8B vertically provided on the turning base plate 8, by a bolt or the like. That is, the rear pillar portions 20B are vertically provided on the upper portions of the pair of bracket members 8B.

Thus, the support frame 20 is a structure body including the four pillar portions 20A and 20B standing on the upper portion of the turning base plate 8 and the plurality of frame portions 20C, 20D, and 20E connecting the pillar portions 20A and 20B substantially horizontally. Note that the support frame 20 is not limited to the configuration of the present embodiment, and can be appropriately changed in accordance with the arrangement, size, and the like of each device mounted on the machine body 2.

Figure 7:
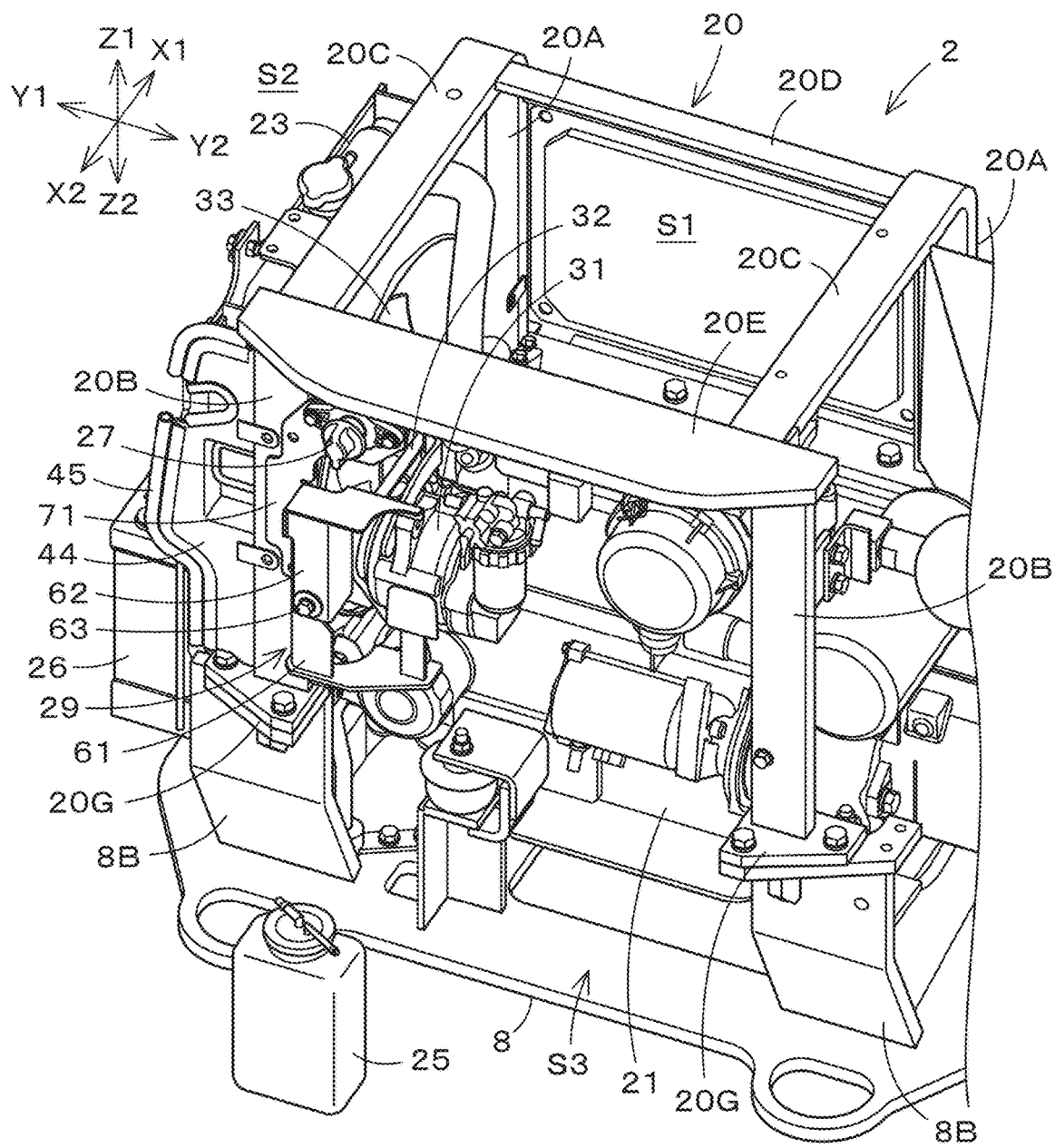
FIG. 7 is a partially exploded perspective view around a rear space of the support frame.
Figure 8:
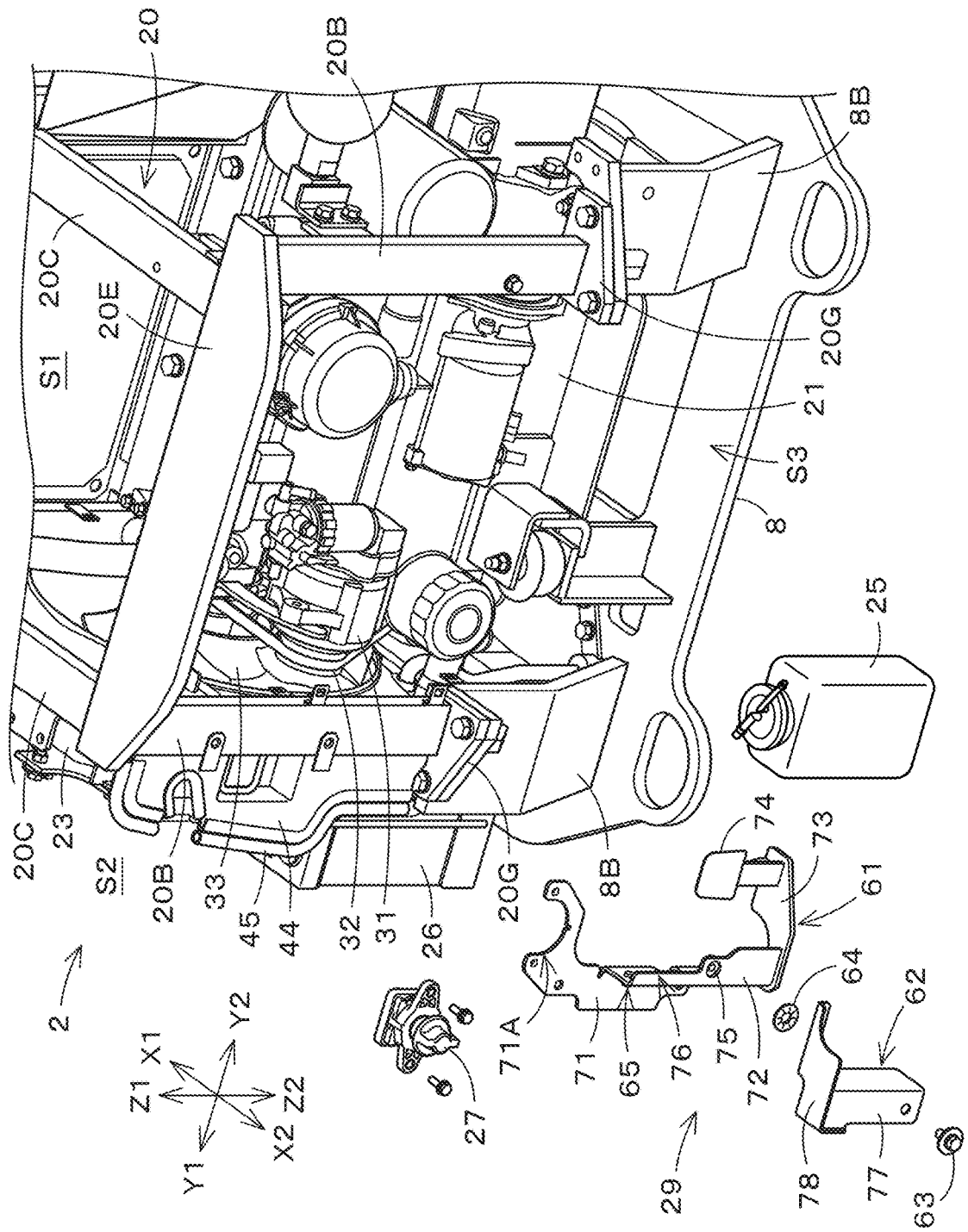
FIG. 8 is a partially exploded perspective view around the rear space of the support frame.

As illustrated in FIGS. 7 and 8, a partition member 44 and the attachment bracket 29 are provided at the left rear pillar portion 20B of the support frame 20. The partition member 44 is provided so as to extend from the upper portion to a lower portion of the left rear pillar portion 20B and to protrude leftward from the left rear pillar portion 20B, and provides partition between the left space S2 and the rear space S3 of the support frame 20.

A seal member 45 is provided at an outer side edge portion of the partition member 44. The seal member 45 is in contact with an inner side surface of the outer cover 10 (third cover body 10C). Accordingly, the partition member 44 and the seal member 45 prevent or reduce a flow of the outside air (cooling air F1) taken into the machine body 2 by the cooling fan 33 from the left space S2 to the rear space S3 of the support frame 20.

The attachment bracket 29 is fixed to a rear portion of the left rear pillar portion 20B of the support frame 20, and supports the reserve tank 25 and the isolator 27 in the rear space S3 of the support frame 20. That is, the attachment bracket 29 supports the reserve tank 25 and the isolator 27 in the vicinity of the rear of the driven units such as the cooling fan 33, the alternator 31, and the power transmission belt 32 provided at positions near the left of the inner space S1 of the support frame 20.

As illustrated in FIGS. 8 to 12, the attachment bracket 29 includes a base member 61, a pressing member 62, a coupling bolt (coupling member) 63, a push nut (falling-off prevention tool) 64, and an engagement portion 65. The base member 61 is fixed to the left rear pillar portion 20B of the support frame 20 by a bolt or the like, and supports the reserve tank 25 and the isolator 27 in the vicinity of the driven units (see FIG. 7). The pressing member 62 is coupled to the base member 61 and holds the reserve tank 25 between the pressing member 62 and the base member 61. The coupling bolt 63 is screwed into and connected to the base member 61 to detachably couple the pressing member 62 to the base member 61. The push nut 64 is fitted onto a bolt shaft of the coupling bolt 63 in an axial direction with the pressing member 62 interposed therebetween, and prevents the coupling bolt 63 from falling off from the pressing member 62. The engagement portion 65 is provided at a coupling portion between the base member 61 and the pressing member 62, and detachably engages the pressing member 62 with the base member 61.

As illustrated in FIGS. 5 and 7, the base member 61 is disposed at a position partially or entirely overlapping the driven units such as the cooling fan 33, the alternator 31, and the power transmission belt 32 when viewed from the rear of the machine body 2. Accordingly, the worker is prevented from inadvertently touching the driven units.

Figure 10:
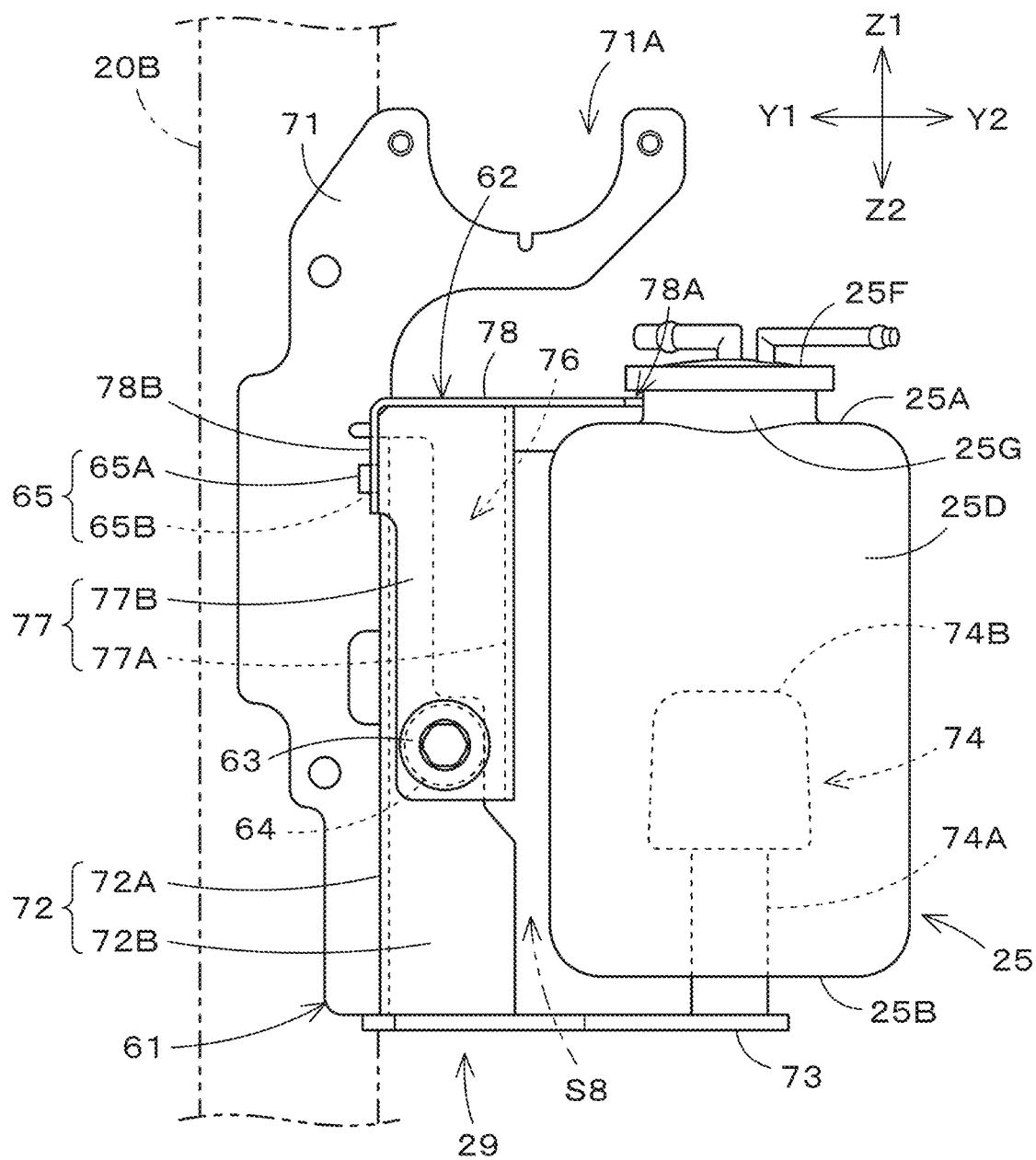
FIG. 10 is a rear view of the attachment bracket and the reserve tank.
Figure 11:
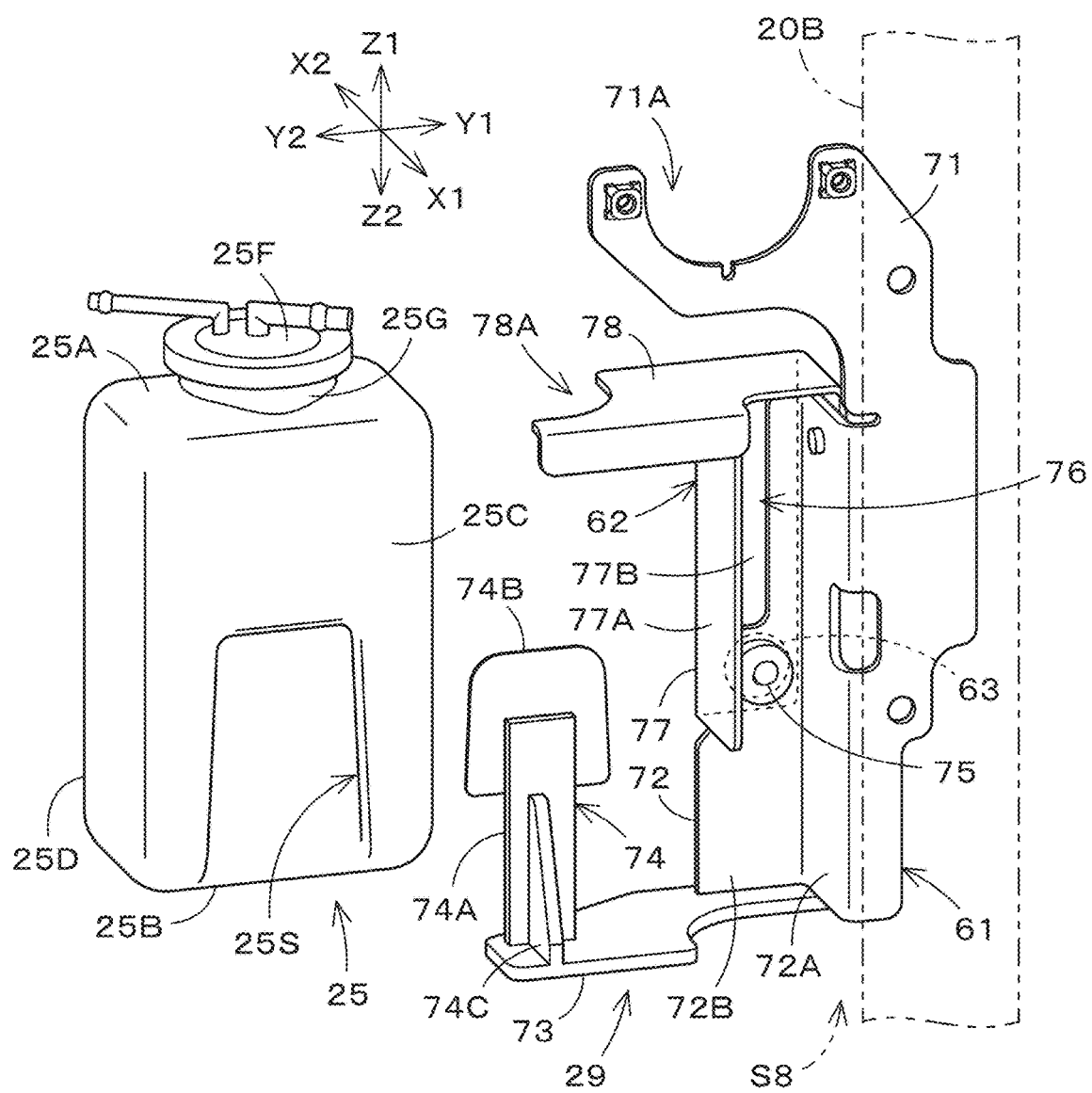
FIG. 11 is a front perspective view of the attachment bracket and the reserve tank.
Figure 12:
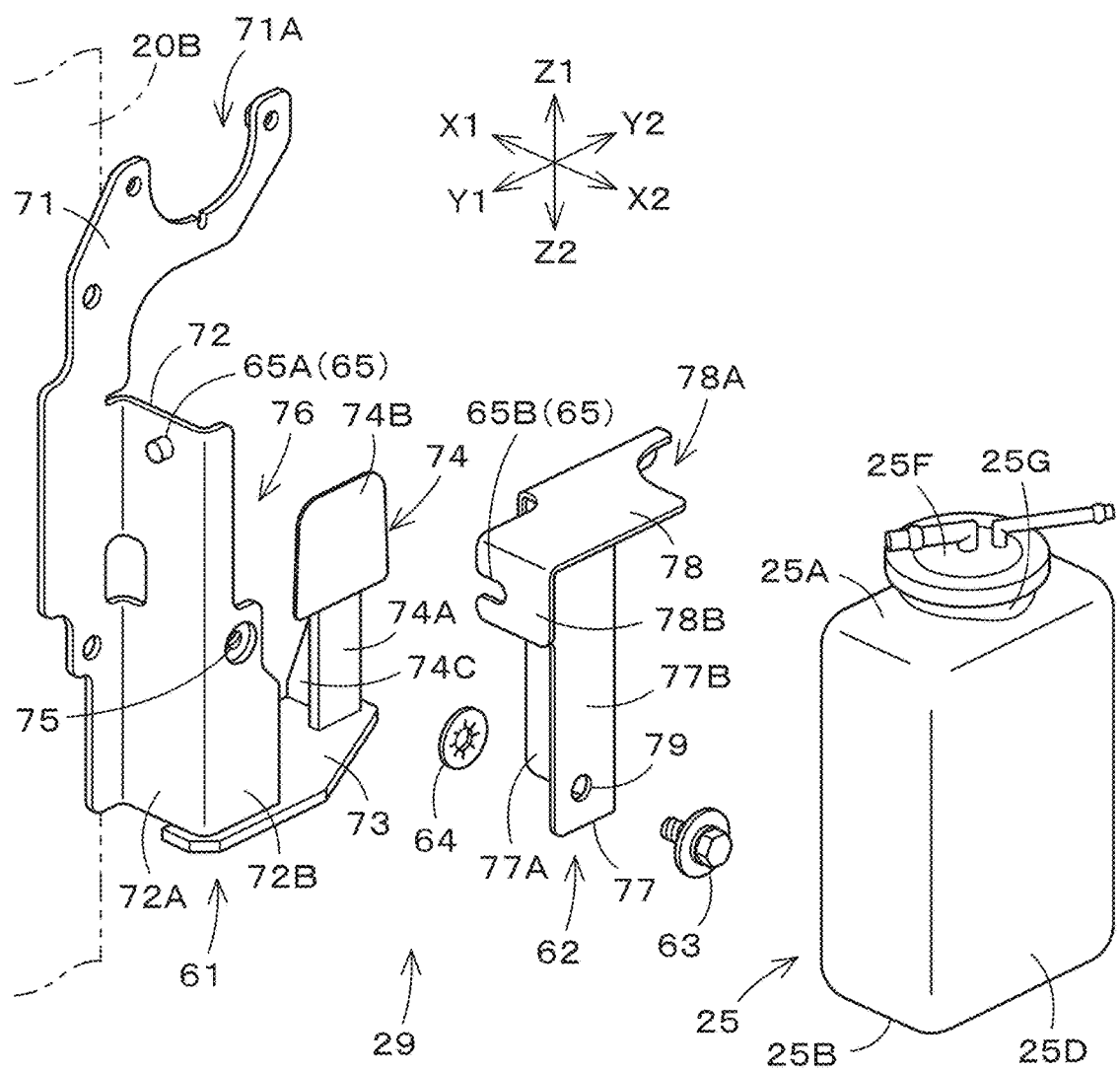
FIG. 12 is a rear perspective view of the attachment bracket and the reserve tank.

As illustrated in FIGS. 10 to 12, the base member 61 includes a fixing frame portion 71, a first coupling frame portion 72, a lower frame portion 73, and a holder portion 74. The fixing frame portion 71 is formed in a plate shape long in the up-down direction, and is fixed to the rear pillar portion 20B in a state in which a front surface portion of the fixing frame portion 71 faces a rear surface portion of the rear pillar portion 20B.

As illustrated in FIGS. 9 to 12, the fixing frame portion 71 has a notch portion 71A. The notch portion 71A is formed in a substantially semicircular arc shape that opens upward at an upper end portion of the fixing frame portion 71. The isolator 27 is fixed to the fixing frame portion 71 by a bolt or the like in a state of being fitted into the notch portion 71A from above. Thus, the isolator 27 is attached to an upper portion of the fixing frame portion 71, that is, an upper portion of the attachment bracket 29 (see FIG. 8).

The first coupling frame portion 72 is coupled to a second coupling frame portion 77 of the pressing member 62 by the coupling bolt 63. The first coupling frame portion 72 is formed in a columnar shape long in the up-down direction, and extends along a right side edge portion of the fixing frame portion 71. The first coupling frame portion 72 is formed in a columnar shape having at least two side surface portions. In the present embodiment, the first coupling frame portion 72 has two side surface portions of a first side surface portion 72A and a second side surface portion 72B. That is, the first coupling frame portion 72 is formed in an L shape when viewed from above.

The first side surface portion 72A is formed by being bent rearward from the right side edge portion of the fixing frame portion 71. The second side surface portion 72B is formed by being bent rightward from a rear edge portion of the first side surface portion 72A. That is, the second side surface portion 72B is provided rightward and rearward of the right side edge portion of the fixing frame portion 71. The reserve tank 25 is arranged rightward of the first coupling frame portion 72. In other words, the first coupling frame portion 72 extends along a gap S8 between the rear pillar portion 20B (support frame 20) and the reserve tank 25 (see FIGS. 9 to 11).

Figure 9:
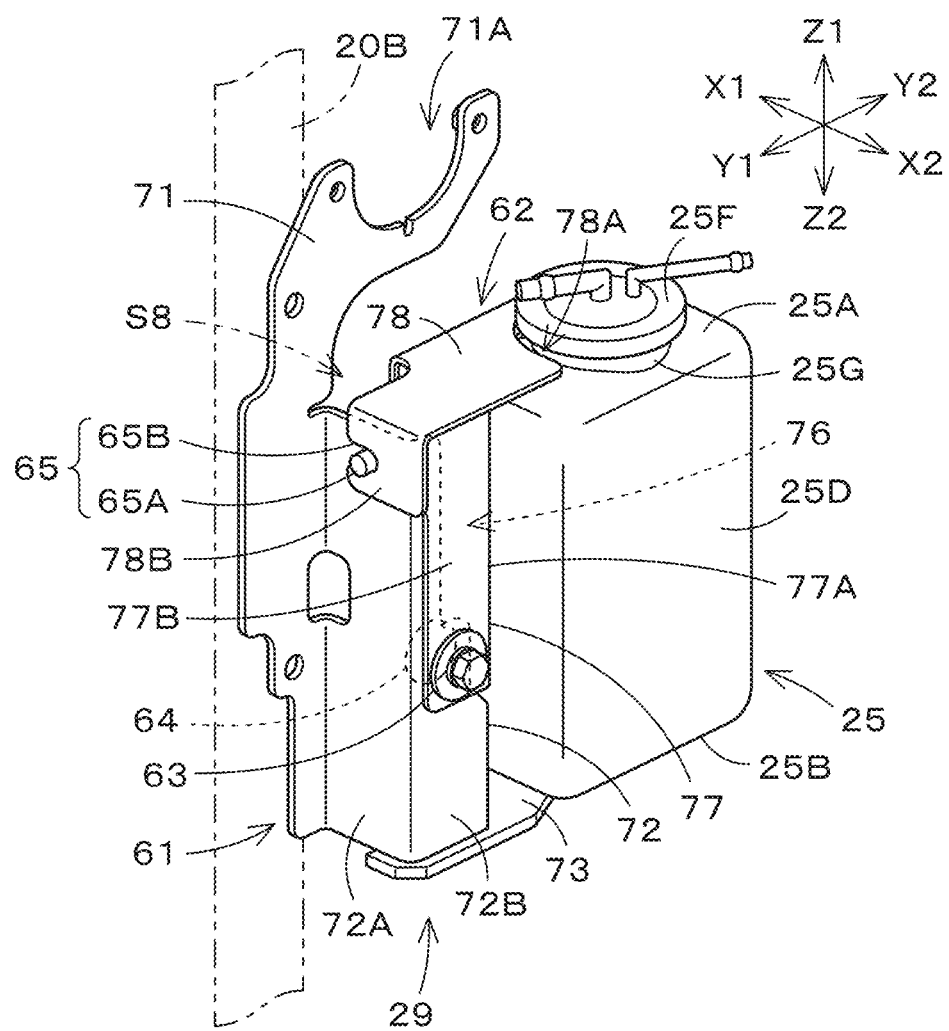
FIG. 9 is a partially exploded perspective view of an attachment bracket and a reserve tank.

As illustrated in FIGS. 9 and 12, the first side surface portion 72A has an engagement pin 65A. The engagement pin 65A is provided to protrude at a position close to an upper end of the first side surface portion 72A, and a hook portion 65B of the pressing member 62 is engaged with the engagement pin 65A when the pressing member 62 is coupled to the base member 61.

As illustrated in FIG. 12, the second side surface portion 72B has a bolt hole 75 and a window hole 76. The bolt hole 75 is provided at a substantially central position in the up-down direction of the second side surface portion 72B. The coupling bolt 63 is screwed into and connected to the bolt hole 75 from the rear. The window hole 76 is a notch formed in a substantially upper half portion of the right side edge portion of the second side surface portion 72B, and allows the inner space S1 of the support frame 20 and the rear space S3 of the support frame 20 to communicate with each other. That is, the window hole 76 is an opening for allowing the driven unit such as the power transmission belt 32 in the inner space S1 of the support frame 20 to be visually recognized from the rear of the machine body 2. Note that the window hole 76 may be a through hole formed through the second side surface portion 72B as long as the driven unit such as the power transmission belt 32 can be visually recognized from the rear of the machine body 2.

As illustrated in FIGS. 10 to 12, the lower frame portion 73 is formed in a plate shape long in the left-right direction, and extends rightward from a lower end portion of the first coupling frame portion 72 in a posture in which flat surface portions of the lower frame portion 73 face upward and downward. The holder portion 74 is vertically provided at a position near a right end of an upper surface portion of the lower frame portion 73. Note that the reserve tank 25 is formed in a bottomed cylindrical shape having a fluid supply port portion 25F in an upper surface portion 25A, and is supported by the lower frame portion 73 from below. In other words, the lower frame portion 73 is disposed so as to face a bottom surface portion 25B of the reserve tank 25, and supports the reserve tank 25 from below.

A neck portion 25G is provided between the upper surface portion 25A and the fluid supply port portion 25F of the reserve tank 25. The neck portion 25G is formed in a substantially cylindrical shape protruding upward from the upper surface portion 25A of the reserve tank 25, and the fluid supply port portion 25F is provided at an upper end portion of the neck portion 25G. The fluid supply port portion 25F is formed in a substantially disk shape having a larger diameter than the diameter of the neck portion 25G.

The holder portion 74 includes a holder pillar 74A, an insertion piece 74B, and a rib 74C. The holder pillar 74A is formed in a columnar shape long in the up-down direction, and extends upward from the upper surface portion of the lower frame portion 73. The insertion piece 74B is formed in a substantially trapezoidal plate shape, and is coupled to an upper end portion of the holder pillar 74A in a posture in which flat surface portions of the insertion piece 74B face in the front-rear direction. The rib 74C is a plate-shaped member extending upward from the upper surface portion of the lower frame portion 73, and a side edge portion of the rib 74C is connected to a plate surface of the holder pillar 74A to reinforce the holder pillar 74A.

As illustrated in FIG. 11, the holder portion 74 is fitted into an insertion groove 25S provided in a front surface portion 25C of the reserve tank 25. The reserve tank 25 is supported by the upper surface portion of the lower frame portion 73 by the insertion piece 74B of the holder portion 74 being fitted into the insertion groove 25S of the front surface portion 25C. Thus, the reserve tank 25 is attached to a right portion of the attachment bracket 29 (rightward of the left rear pillar portion 20B), and is disposed at a position overlapping the alternator 31 when viewed from the rear of the machine body 2 (see FIGS. 5 and 7). Accordingly, the worker is prevented from inadvertently touching the alternator 31 or another driven unit (cooling fan 33, power transmission belt 32, or the like).

As illustrated in FIGS. 5 and 7, the pressing member 62 is disposed at a position overlapping the driven units such as the cooling fan 33, the alternator 31, and the power transmission belt 32 when viewed from the rear of the machine body 2. Accordingly, the worker is prevented from inadvertently touching the driven units. Thus, the attachment bracket 29 has both a function of supporting the reserve tank 25 inside the machine body 2 and a function of preventing the worker from inadvertently touching the driven unit such as the power transmission belt 32.

As illustrated in FIGS. 9 to 12, the pressing member 62 includes the second coupling frame portion 77 and an upper frame portion 78. The second coupling frame portion 77 is coupled to the first coupling frame portion 72 of the base member 61 by the coupling bolt 63.

The second coupling frame portion 77 is formed in a columnar shape long in the up-down direction and is provided to overlap the first coupling frame portion 72. That is, the second coupling frame portion 77 is formed in a columnar shape extending along the first coupling frame portion 72. The second coupling frame portion 77 is formed in a columnar shape having at least two side surface portions. In the present embodiment, the second coupling frame portion 77 has two side surface portions of a third side surface portion 77A and a fourth side surface portion 77B. That is, the second coupling frame portion 77 is formed in an L shape when viewed from above.

The third side surface portion 77A is disposed rightward of the first coupling frame portion 72 and substantially parallel to the first side surface portion 72A in a state in which the pressing member 62 is coupled to the base member 61. The fourth side surface portion 77B is formed by being bent leftward from a rear edge portion of the third side surface portion 77A. The fourth side surface portion 77B is disposed to overlap a rear surface portion of the first coupling frame portion 72 (second side surface portion 72B) from the rear in the state in which the pressing member 62 is coupled to the base member 61.

The fourth side surface portion 77B has a bolt insertion hole 79. The bolt insertion hole 79 is formed through the fourth side surface portion 77B at a position near a lower end thereof. The coupling bolt 63 is screwed into the bolt hole 75 provided in the first coupling frame portion 72 of the base member 61 through the bolt insertion hole 79. Accordingly, the first coupling frame portion 72 of the base member 61 and the second coupling frame portion 77 of the pressing member 62 are fixed to each other in a state of overlapping each other in the front-rear direction. Thus, the first coupling frame portion 72 and the second coupling frame portion 77 are coupled by the coupling bolt 63 to define a substantially quadrangular columnar frame body defined by a left side surface portion (first side surface portion 72A), a rear surface portion (second side surface portion 72B, fourth side surface portion 77B), and a right side surface portion (third side surface portion 77A) located rightward of the fixing frame portion 71.

Also, at this time, the fourth side surface portion 77B of the second coupling frame portion 77 covers the window hole 76 provided in the first coupling frame portion 72 from the rear of the support frame 20. That is, the pressing member 62 includes the fourth side surface portion 77B that serves as a cover portion capable of covering the window hole 76 provided in the first coupling frame portion 72. Thus, when the pressing member 62 is detached from the base member 61, the driven unit such as the power transmission belt 32 can be visually recognized from the window hole 76.

Note that the coupling bolt 63 of the present embodiment is a hexagonal-head bolt. Thus, when the pressing member 62 is detached from the base member 61, it is necessary to remove the coupling bolt 63 using a tool such as a wrench. Accordingly, even if an excessive force is applied to the pressing member 62 from the outside, the pressing member 62 is not easily detached from the base member 61. Also, the coupling bolt 63 is held in a state of being attached to the pressing member 62 by the push nut 64. Thus, when the pressing member 62 is detached from the base member 61, there is no possibility that the coupling bolt 63 falls off into or out of the machine body 2. Note that the coupling bolt 63 may be held by the pressing member 62 or the base member 61 in a falling-off prevention state by using another falling-off prevention tool (various types of falling-off prevention washers, falling-off prevention screws, and the like) instead of the push nut 64 as long as the pressing member 62 can be prevented from falling off into or out of the machine body 2 when the pressing member 62 is detached from the base member 61.

As illustrated in FIGS. 10 to 12, the upper frame portion 78 is formed in a plate shape long in the left-right direction, and extends rightward from an upper end portion of the second coupling frame portion 77 in a posture in which flat surface portions of the upper frame portion 78 face upward and downward. The upper frame portion 78 is disposed so as to face the upper surface portion 25A of the reserve tank 25, and holds the reserve tank 25 from above. Thus, the reserve tank 25 is held by being sandwiched between the lower frame portion 73 and the upper frame portion 78 in the up-down direction. Thus, the reserve tank 25 is supported by the attachment bracket 29 in a state in which at least a rear surface portion 25D is not covered. Accordingly, the worker can clearly visually recognize the amount of the coolant stored in the reserve tank 25 from the rear of the machine body 2.

As illustrated in FIGS. 9 and 12, the upper frame portion 78 has the hook portion 65B and a notch portion 78A. The hook portion 65B is provided in a bent piece 78B that is bent downward from a left end edge portion of the upper frame portion 78. The hook portion 65B is formed in a substantially U shape that is open forward at the left end edge portion of the upper frame portion 78, and is engaged with the engagement pin 65A of the base member 61 from the rear when the pressing member 62 is coupled to the base member 61. Accordingly, the pressing member 62 is prevented from moving in the up-down direction. The engagement portion 65 includes the engagement pin 65A and the hook portion 65B.

The notch portion 78A is formed in a substantially quarter arc shape that is open rightward and rearward at a right side end portion of the upper frame portion 78, and is fitted onto the neck portion 25G of the reserve tank 25 in the state in which the pressing member 62 is coupled to the base member 61. That is, the upper frame portion 78 is disposed to face the periphery of the neck portion 25G at the upper surface portion 25A of the reserve tank 25, and holds the reserve tank 25 from above.

With the above-described configuration, the attachment bracket 29 has rigidity that does not plastically deform even when the reserve tank 25 is pushed in each direction, such as from above, rear, left, or right, with a predetermined force or less (for example, 250 N or less), and has a holding force with which the reserve tank 25 does not fall off from the base member 61.

Note that, in the above-described embodiment, the attachment bracket 29 is provided at the rear portion of the support frame 20. However, the attachment bracket 29 may be provided at a side portion of the support frame 20 as long as the attachment bracket 29 can support the peripheral device such as the reserve tank 25 in the vicinity of the driven unit such as the power transmission belt 32.

Also, in the above-described embodiment, the attachment bracket 29 is configured to support the reserve tank 25 and the isolator 27. However, the attachment bracket 29 may be configured to support only one of the reserve tank 25 and the isolator 27, or may support a peripheral device such as a fuel pump, a fuel filter, a fuse box, or a battery disposed in the periphery of the prime mover 21.

Also, in the above-described embodiment, the driven units such as the cooling fan 33, the alternator 31, and the power transmission belt 32 are provided at positions near the left of the inner space S1 of the support frame 20. However, the driven units may be provided at positions near the right of the inner space S1 of the support frame 20 or may be provided at positions near the rear at the center in the left-right direction of the inner space S1 of the support frame 20.

The present invention provides a working machine 1 described in the following items.

(Item 1) A working machine 1 comprising: a machine body 2; a prime mover 21 mounted on the machine body 2; a peripheral device disposed in a periphery of the prime mover 21; and an attachment bracket 29 to support the peripheral device, wherein the attachment bracket 29 includes a base member 61 to support the peripheral device in a vicinity of a driven unit to be driven with power of the prime mover 21, and a pressing member 62 coupled to the base member 61, to hold the peripheral device between the pressing member 62 and the base member 61.

With the working machine 1 according to Item 1, the peripheral device can be firmly supported by the base member 61 and the pressing member 62 of the attachment bracket 29. Also, the peripheral device is firmly supported in the vicinity of the driven unit, and hence the worker can be reliably prevented from inadvertently touching the driven unit during inspection.

(Item 2) The working machine 1 according to Item 1, wherein the base member 61 includes a first coupling frame portion 72 defining a coupling portion to the pressing member 62, and the first coupling frame portion 72 is formed in a columnar shape extending in an up-down direction of the machine body 2.

With the working machine 1 according to Item 2, the force applied to the peripheral device in the up-down direction can be received by the first coupling frame portion 72 extending in the up-down direction of the machine body 2, and hence the support strength for the peripheral device is further improved.

(Item 3) The working machine 1 according to Item 2, comprising: a cover body 10 defining an outer shell of the machine body 2; and a support frame 20 vertically provided inside the machine body 2, to support the cover body 10, wherein the first coupling frame portion 72 extends along a gap between the support frame 20 and the peripheral device.

With the working machine 1 according to Item 3, the first coupling frame portion 72 serves as a barrier wall of the gap S8 between the support frame 20 and the peripheral device, and hence the worker can be more reliably prevented from inadvertently touching the driven unit during inspection.

(Item 4) The working machine 1 according to Item 2, wherein the pressing member 62 includes a second coupling frame portion 77 coupled to the first coupling frame portion 72, and the second coupling frame portion 77 is formed in a columnar shape extending along the first coupling frame portion 72.

With the working machine 1 according to Item 4, the force applied to the peripheral device in the up-down direction can be received by the first coupling frame portion 72 and the second coupling frame portion 77 extending in the up-down direction of the machine body 2, and hence the support strength for the peripheral device is further improved.

(Item 5) The working machine 1 according to any one of Items 1 to 4, wherein the pressing member 62 includes a second coupling frame portion 77 defining a coupling portion to the base member 61, and the second coupling frame portion 77 is formed in a columnar shape extending in an up-down direction of the machine body 2.

With the working machine 1 according to Item 5, the force applied to the peripheral device in the up-down direction can be received by the second coupling frame portion 77 extending in the up-down direction of the machine body 2, and hence the support strength for the peripheral device is further improved.

(Item 6) The working machine 1 according to any one of Items 1 to 5, wherein the base member 61 includes a lower frame portion 73 to support the peripheral device from below, and the pressing member 62 has an upper frame portion 78 to hold the peripheral device from above.

With the working machine 1 according to Item 6, the peripheral device can be held in the up-down direction by the lower frame portion 73 of the base member 61 and the upper frame portion 78 of the pressing member 62, and hence the support strength for the peripheral device is further improved.

(Item 7) The working machine 1 according to any one of Items 1 to 6, wherein the base member 61 includes a first coupling frame portion 72 defined by a plate-shaped member that is formed in an L shape when viewed from above and that has a first side surface portion 72A and a second side surface portion 72B, and having a columnar shape long in an up-down direction, and a lower frame portion 73 laterally extending from a lower portion of the first coupling frame portion 72 such that plate surfaces of the lower frame portion 73 face in the up-down direction, the pressing member 62 includes a second coupling frame portion 77 defined by a plate-shaped member that is formed in an L shape when viewed from above and that has a third side surface portion 77A) and a fourth side surface portion 77B, and having a columnar shape long in the up-down direction, and an upper frame portion 78 laterally extending from an upper portion of the second coupling frame portion 77 such that plate surfaces of the upper frame portion 78 face in the up-down direction, and the peripheral device is held in a state of being sandwiched between the lower frame portion 73 and the upper frame portion (78) from above and below.

With the working machine 1 according to Item 7, the force applied to the peripheral device in the up-down direction can be received by the first coupling frame portion 72 provided at the base member 61, having the L shape when viewed from above, and being long in the up-down direction; the lower frame portion 73 extending from the lower portion of the first coupling frame portion 72; the second coupling frame portion 77 provided at the pressing member 62, having the L shape when viewed from above, and being long in the up-down direction; and the upper frame portion 78 extending from the upper portion of the second coupling frame portion 77. Hence the support strength for the peripheral device is further improved.

(Item 8) The working machine 1 according to Item 8, wherein the base member 61 further includes a holder portion 74 extending upward from the lower frame portion 73, and the peripheral device is held in a state in which the peripheral device is sandwiched between the lower frame portion 73 and the upper frame portion 78 from above and below and a surface of the peripheral device near the driven unit is supported by the holder portion 74.

With the working machine 1 according to Item 8, the peripheral device can be held in the up-down direction by the lower frame portion 73 of the base member 61 and the upper frame portion 78 of the pressing member 62, and the surface of the peripheral device near the driven unit can be supported by the holder portion 74 of the lower frame portion 73. Hence the support strength for the peripheral device is further improved.

(Item 9) The working machine 1 according to Item 8, wherein the holder portion 74 includes a holder pillar 74A extending upward from the lower frame portion 73 and an insertion piece 74B coupled to the holder pillar 74A, the peripheral device includes an insertion groove 25S in the surface near the driven unit, and the surface of the peripheral device near the driven unit is supported by the holder portion 74 by the insertion piece 74B being fitted into the insertion groove 25S.

With the working machine 1 according to Item 9, the insertion piece 74B provided at the holder pillar 74A of the lower frame portion 73 can be fitted into and hold the insertion groove 25S of the peripheral device. Hence the support strength for the peripheral device is further improved.

(Item 10) The working machine 1 according to Item 8, wherein the upper frame portion 78 has a notch portion 78A formed in a substantially arc shape, the peripheral device has a neck portion 25G protruding upward, and the neck portion 25G is fitted into the notch portion 78A.

With the working machine 1 according to Item 10, the neck portion 25G of the peripheral device can be fitted into and held by the notch portion 78A of the upper frame portion 78. Hence the support strength for the peripheral device is further improved.

(Item 11) The working machine 1 according to any one of Items 1 to 10, wherein the base member 61 and the pressing member 62 are disposed at positions partially or entirely overlapping the driven unit as viewed from rear of the machine body 2.

With the working machine 1 according to Item 11, the worker can be reliably prevented from inadvertently touching the driven unit when the worker is performing inspection work at the rear of the machine body 2.

(Item 12) The working machine 1 according to Item 11, wherein the base member 61 has a window hole 76 through which the driven unit is visually recognizable from the rear of the machine body 2.

With the working machine 1 according to Item 12, even though the peripheral device is not detached from the attachment bracket 29, the periphery of the driven unit can be visually observed through the window hole 76 from the rear of the machine body 2. Hence workability during inspection is improved.

(Item 13) The working machine 1 according to Item 12, wherein the attachment bracket 29 includes a coupling member 63 to detachably couple the pressing member 62 to the base member 61.

With the working machine 1 according to Item 13, even though the peripheral device is not detached from the attachment bracket 29, the periphery of the driven unit can be visually observed through the window hole 76 from the rear of the machine body 2 by detachment of the pressing member 62 from the base member 61. Hence workability during inspection is improved.

(Item 14) The working machine 1 according to Item 13, wherein the attachment bracket 29 has an engagement portion 65 to detachably engage the pressing member 62 with the base member 61.

With the working machine 1 according to Item 14, the pressing member 62 is coupled to the base member 61 at a plurality of positions, that is, the coupling member 63 and the engagement portion 65. Hence the peripheral device can be more firmly supported by the attachment bracket 29.

Accordingly, the worker can be more reliably prevented from inadvertently touching the driven unit during inspection.

(Item 15) The working machine 1 according to Item 6, wherein the peripheral device is a reserve tank 25 formed in a bottomed cylindrical shape having a fluid supply port portion 25F in an upper surface portion 25A, to store a coolant for the prime mover 21, the lower frame portion 73 extends along a bottom surface portion 25B of the reserve tank 25, and the upper frame portion 78 extends along the upper surface portion 25A of the reserve tank 25.

The reserve tank 25 is relatively large in view of the role of storing the coolant for the prime mover 21, and the worker is likely to lean against or strongly touch the reserve tank 25 during inspection. However, with the working machine 1 according to aforementioned Item 14, the reserve tank (peripheral device) 25 is held by the lower frame portion 73 of the base member 61 and the upper frame portion 78 of the pressing member 62 in the up-down direction, and hence the support strength for the reserve tank (peripheral device) 25 is further improved.

While example embodiments of the present invention have been described above, it is to be understood that variations and modifications will be apparent to those skilled in the art without departing from the scope and spirit of the present invention. The scope of the present invention, therefore, is to be determined solely by the following claims.

Also, in the above-described embodiment, the example has been described in which the present invention is applied to the working machine such as a backhoe. However, an application target of the present invention is not limited to the working machine such as a backhoe, and may be applied to a construction machine such as a wheel loader, a compact track loader, or a skid-steer loader, or may be applied to an agricultural machine such as a tractor, a combine, a rice transplanter, or a lawn mower.

What is claimed is:

1. A working machine comprising:
a machine body;
a prime mover mounted on the machine body;
a peripheral device disposed in a periphery of the prime mover; and
an attachment bracket to support the peripheral device, wherein
the attachment bracket includes a base member to support the peripheral device in a vicinity of a driven unit to be driven with power of the prime mover, and a pressing member coupled to the base member, to hold the peripheral device between the pressing member and the base member,
the base member includes a first coupling frame portion defining a coupling portion to the pressing member,
the pressing member includes a second coupling frame portion coupled to the first coupling frame portion,
the first coupling frame portion is formed in a columnar shape extending in an up-down direction of the machine body, and
the second coupling frame portion is formed in a columnar shape long in the up-down direction of the machine body and is provided to overlap the first coupling frame portion.

2. The working machine according to claim 1, comprising:
a cover body defining an outer shell of the machine body; and
a support frame vertically provided inside the machine body, to support the cover body, wherein
the first coupling frame portion extends along a gap between the support frame and the peripheral device.

3. The working machine according to claim 1, wherein
the base member includes a lower frame portion to support the peripheral device from below, and
the pressing member has an upper frame portion to hold the peripheral device from above.

4. The working machine according to claim 1, wherein the base member and the pressing member are disposed at positions partially or entirely overlapping the driven unit as viewed from rear of the machine body.

5. A working machine comprising:
a machine body;
a prime mover mounted on the machine body;
a peripheral device disposed in a periphery of the prime mover; and
an attachment bracket to support the peripheral device, wherein
the attachment bracket includes a base member to support the peripheral device in a vicinity of a driven unit to be driven with power of the prime mover, and a pressing member coupled to the base member, to hold the peripheral device between the pressing member and the base member,
the base member includes
a first coupling frame portion defined by a plate-shaped member that is formed in an L shape when viewed from above and that has a first side surface portion and a second side surface portion, and having a columnar shape long in an up-down direction, and
a lower frame portion laterally extending from a lower portion of the first coupling frame portion such that plate surfaces of the lower frame portion face in the up-down direction,
the pressing member includes
a second coupling frame portion defined by a plate-shaped member that is formed in an L shape when viewed from above and that has a third side surface portion and a fourth side surface portion, and having a columnar shape long in the up-down direction, and
an upper frame portion laterally extending from an upper portion of the second coupling frame portion such that plate surfaces of the upper frame portion face in the up-down direction, and
the peripheral device is held in a state of being sandwiched between the lower frame portion and the upper frame portion from above and below.

6. The working machine according to claim 5, wherein
the base member further includes a holder portion extending upward from the lower frame portion, and
the peripheral device is held in a state in which the peripheral device is sandwiched between the lower frame portion and the upper frame portion from above and below and a surface of the peripheral device near the driven unit is supported by the holder portion.

7. The working machine according to claim 6, wherein
the holder portion includes a holder pillar extending upward from the lower frame portion and an insertion piece coupled to the holder pillar,
the peripheral device includes an insertion groove in the surface near the driven unit, and
the surface of the peripheral device near the driven unit is supported by the holder portion by the insertion piece being fitted into the insertion groove.

8. The working machine according to claim 6, wherein
the upper frame portion has a notch portion formed in a substantially arc shape, the peripheral device has a neck portion protruding upward, and the neck portion is fitted into the notch portion.

9. A working machine comprising:

a machine body;

a prime mover mounted on the machine body;

a peripheral device disposed in a periphery of the prime mover; and an attachment bracket to support the peripheral device, wherein the attachment bracket includes a base member to support the peripheral device in a vicinity of a driven unit to be driven with power of the prime mover, and a pressing member coupled to the base member, to hold the peripheral device between the pressing member and the base member, the base member and the pressing member are disposed at positions partially or entirely overlapping the driven unit as viewed from rear of the machine body, and the base member has a window hole through which the driven unit is visually recognizable from the rear of the machine body.

10. The working machine according to claim 9, wherein the attachment bracket includes a coupling member to detachably couple the pressing member to the base member.

11. The working machine according to claim 10, wherein the attachment bracket has an engagement portion to detachably engage the pressing member with the base member.

* * * * *